US012701328B2

(12) United States Patent
Paulitsch et al.

(10) Patent No.: US 12,701,328 B2
(45) Date of Patent: Aug. 4, 2026

(54) HIGH DYNAMIC RANGE IMAGING USING EXTERNAL LIGHT SOURCE

(71) Applicant: Intel Corporation, Santa Clara, CA (US)

(72) Inventors: Michael Paulitsch, Ottobrunn (DE); Ignacio J. Alvarez, Portland, OR (US); Fabian Oboril, Karlsruhe (DE); Florian Geissler, Munich (DE); Ralf Graefe, Haar (DE); Yang Peng, Munich (DE); Norbert Stoeffler, Graefeling (DE); Neslihan Kose Cihangir, Munich (DE)

(73) Assignee: Intel Corporation, Santa Clara, CA (US)

( * ) Notice: Subject to any disclaimer, the term of this patent is extended or adjusted under 35 U.S.C. 154(b) by 863 days.

(21) Appl. No.: 18/147,714

(22) Filed: Dec. 29, 2022

(65) Prior Publication Data

US 2024/0223909 A1 Jul. 4, 2024

(51) Int. Cl.
*H04N 23/741* (2023.01)
*G01S 17/86* (2020.01)
(Continued)

(52) U.S. Cl.
CPC ........... *H04N 23/741* (2023.01); *G01S 17/86* (2020.01); *G01S 17/931* (2020.01); *H04N 5/265* (2013.01);
(Continued)

(58) Field of Classification Search
CPC ....... G01S 17/86; G01S 17/931; H04N 23/16; H04N 23/72; H04N 23/74; H04N 23/741; H04N 23/951
See application file for complete search history.

(56) References Cited

U.S. PATENT DOCUMENTS

| | | | |
|---|---|---|---|
| 10,345,447 B1 * | 7/2019 | Hicks | G06V 20/56 |
| 2020/0018854 A1 * | 1/2020 | Hicks | G01S 7/4802 |

(Continued)

OTHER PUBLICATIONS

Businesswire, "Insight LiDAR Announces Highest Resolution FMCW LiDAR for Autonomous Vehicles"; https://www.businesswire.com/news/home/20200106005892/en/Insight-LiDAR-Announces-Highest-Resolution-FMCW-LiDAR-for-Autonomous-Vehicles; retrieved on Nov. 4, 2022; dated Jan. 6, 2020; 2 pages.

(Continued)

*Primary Examiner* — Michael A Lyons
(74) *Attorney, Agent, or Firm* — Viering, Jentschura & Partner mbB

(57) ABSTRACT

Disclosed herein are devices, methods, and systems for providing an externally augmented camera that may utilize external light sources of a separate sensor to emit light toward a scene so as to provide accurate imaging of the scene, even in dark or low-light situations or where the scene has a high dynamic range of brightness. The externally augmented camera system may include a sensor with a light source capable of emitting light toward a scene, a camera separate from the light source, where the camera includes a detector capable of detecting emitted light from the light source. The externally augmented camera system also causes the sensor to emit light toward the scene via the light source, causes the camera to capture image data of the scene that has been illuminated by emitted light from the light source, and generates an image of the scene based on the image data.

17 Claims, 6 Drawing Sheets

100

(51) Int. Cl.
| | |
|---|---|
| *G01S 17/931* | (2020.01) |
| *H04N 5/265* | (2006.01) |
| *H04N 23/16* | (2023.01) |
| *H04N 23/72* | (2023.01) |
| *H04N 23/74* | (2023.01) |
| *H04N 23/951* | (2023.01) |

(52) U.S. Cl.
CPC .............. *H04N 23/16* (2023.01); *H04N 23/72* (2023.01); *H04N 23/74* (2023.01); *H04N 23/951* (2023.01)

(56) References Cited

U.S. PATENT DOCUMENTS

| | | | | |
|---|---|---|---|---|
| 2022/0108548 A1* | 4/2022 | Kim | ....................... | G06V 10/22 |
| 2023/0031023 A1* | 2/2023 | Wang | .................... | H04N 23/74 |
| 2023/0039270 A1* | 2/2023 | Niwa | ....................... | G01S 7/493 |

OTHER PUBLICATIONS

Fitzgeralt, Mark; "Automative LiDAR: Rounding Out the ADAS and Autonomous Driving Sensor Suite"; Strategy Analytics; dated Sep. 7, 2021; 16 pages.

Weber, Harald; "LiDAR Sensor functionality and variants"; https://cdn.sick.com/media/docs/3/63/963/whitepaper_lidar_en_im0079963.pdf; retrieved on Nov. 4, 2022; dated Jul. 2018; 16 pages; Sick AG Whitepaper.

Roriz, Ricardo et al.; "Automotive LiDAR Technology: A Survey"; https://ieeexplore.ieee.org/document/9455394; retrieved on Nov. 4, 2022; IEEE Transactions on intelligent transportation systems; dated Jul. 2022; 16 pages; vol. 23, No. 7.

Gallego, Guillermo et al.; "Event-based Vision: A Survey"; https://rpg.ifi.uzh.ch/docs/EventVisionSurvey.pdf; retrieved on Nov. 4, 2022; IEEE Transactions on Pattern Analysis and Machine Intelligence; arXiv; dated Aug. 2020; 30 pages.

Hecht, Jeff; "Lasers for Lidar: FMCW lidar: An alternative for self-driving cars"; https://www.laserfocusworld.com/home/article/16556322/lasers-for-lidar-fmcw-lidar-an-alternative-forselfdriving-cars; retrieved on Nov. 4, 2022; Laserfocus world; dated May 2019; 7 pages.

Wikipedia; "Event camera"; https://en.wikipedia.org/wiki/Event_camera; retrieved on Nov. 4, 2022; dated Oct. 2022; 8 pages.

Wikipedia; "Lidar"; https://en.wikipedia.org/wiki/Lidar; retrieved on Nov. 4, 2022; dated Oct. 2022; 35 pages.

Maruthaiyan, Bremi; "What is High Dynamic Range (HDR)? How do HDR cameras work?"; https://www.e-consystems.com/blog/camera/technology/what-is-high-dynamic-range-hdr-how-do-hdr-cameras-work/#:~:text=An%20HDR%20image%20is%20usually; retrieved on Nov. 4, 2022; dated Feb. 2021; 5 pages.

* cited by examiner

Examples of Laser Positions
(pulsed at different times)

HIGH DYNAMIC RANGE IMAGING USING EXTERNAL LIGHT SOURCE

TECHNICAL FIELD

The disclosure relates generally to imaging systems, and in particular to imaging systems for automated and semiautomated vehicles with multiple sensor systems that sense the environment around the vehicle and detect objects using the imaging.

BACKGROUND

Automated and semiautomated vehicles often rely on multiple sensor systems to sense the environment around the vehicle and detect obstacles, objects, other road participants, roadways, etc. Imaging is often one aspect of such sensing and detecting systems, where the system may include an imaging sensor to render images of the environment, and then the image is processed to identify hazards. Imaging systems often include one or more cameras, such as an infrared camera (IR), a red-green-blue (RGB) camera, an event camera, etc. that may be used to render images. In addition, the vehicle may include other sensor systems, such as light-detection-and-ranging (LiDAR) systems that may be used may be used as part of a safety system or automated driving system to render individual "views" of the environment that may be fused together in a decision system to detect hazards, adjust driving, parameters, etc., based on the numerous sensor inputs. However, not all sensors operate with the same level of performance in all environmental conditions. For example, the detectors in a typical camera system may not operate well in low-light conditions, while other systems, such as a LiDAR, sensor system or radar system may still be able to provide accurate data in low-light conditions. Given the importance of camera systems to the perception and planning systems in today's vehicles, it may be problematic if the camera system is unable to obtain accurate imaging in all operating environments (e.g., in low-light conditions, high glare conditions, etc.).

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
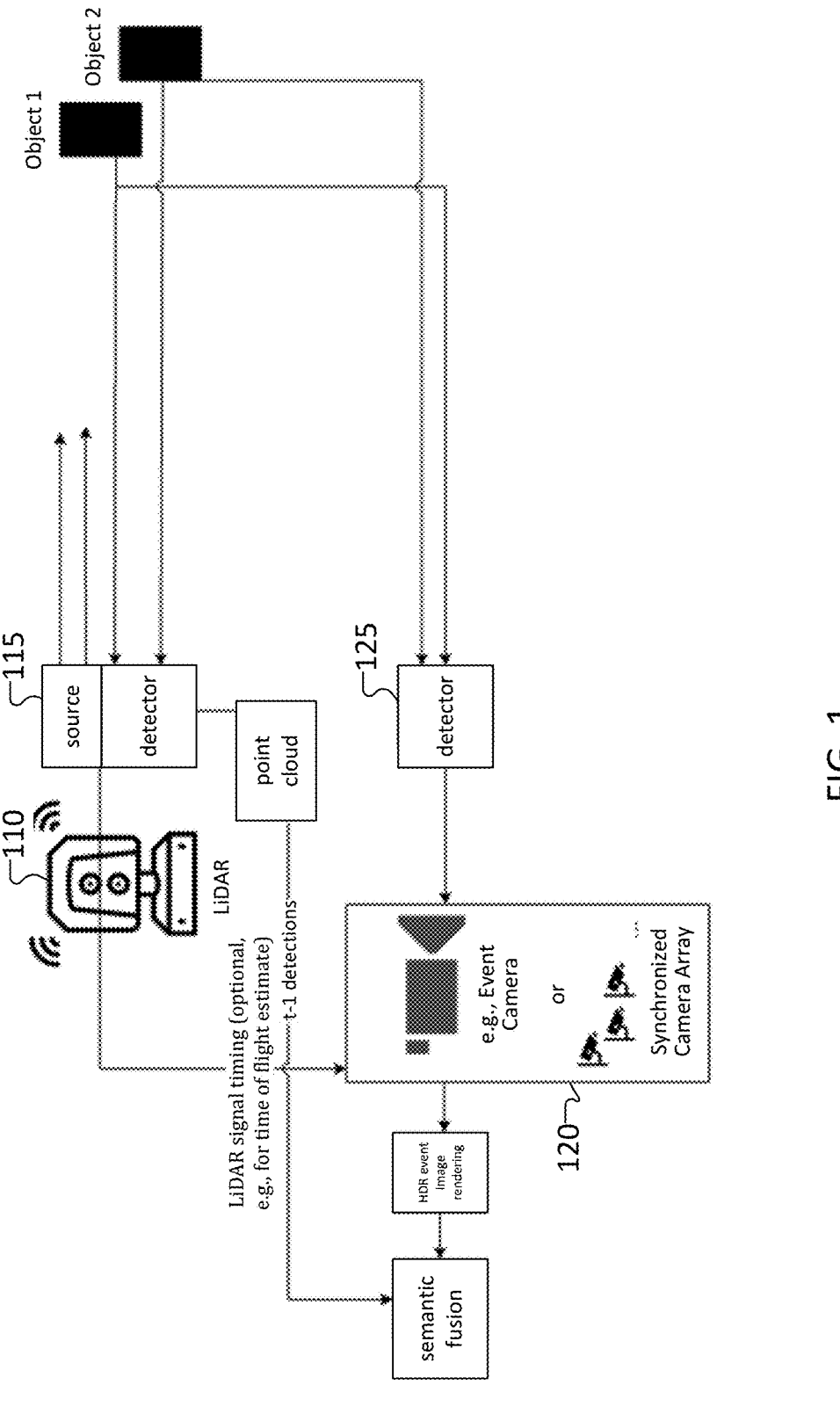
FIG. 1 shows an example of an externally augmented camera system.

The following detailed description refers to the accompanying drawings that show, by way of illustration, exemplary details and features.

The word "exemplary" is used herein to mean "serving as an example, instance, or illustration." Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. The term "data", however, is not limited to the aforementioned examples and may take various forms and represent any information as understood in the art.

The terms "processor" or "controller" as, for example, used herein may be understood as any kind of technological entity (e.g., hardware, software, and/or a combination of both) that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, software, firmware, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both "direct" calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, or a rocket, among others.

The term "autonomous vehicle" may describe a vehicle capable of implementing at least one vehicle maneuver without driver input. A vehicle maneuver may describe or include a change in one or more of steering, braking, acceleration/deceleration, etc. of the vehicle. A vehicle may be described as autonomous even in case the vehicle is not fully automatic (for example, fully operational with driver input or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances, but may leave other aspects of vehicle navigation to the driver during other circumstances (e.g., braking under certain circumstances). Autonomous vehicles may also include vehicles that share the control of one or more aspects of vehicle maneuver implementation/planning under certain circumstances (e.g., hands-on, such as responsive to a driver input) and vehicles that control one or more aspects of vehicle maneuvering under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle.

An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

As noted above, multiple sensor systems may be employed by a vehicle to sense the environment around the vehicle. In particular LiDAR systems and camera systems are often present at the same time to sense different views of the environment from the perspective of different types of sensors. In times of darkness, in low-light conditions, or in situations where there is a large dynamic range of brightness in a given scene, cameras often fail to provide an accurate image of the environment and may be rendered useless to the vehicle's sensing system. On the other hand, other systems, such as LiDAR or radar, may remain active and provide useful information about the environment.

As discussed in more detail below the externally augmented camera system disclosed below may utilize devices external to the camera system (e.g., secondary sensor systems, such as a LiDAR, or an external light emitter), to emit an active "lighting" source toward the scene so that the camera system may be able to provide accurate images, even in darkness, low-light, or in situations where there is a large dynamic range of brightness in a given scene, where a conventional camera system would normally be unable to render a visible image of the scene (e.g., scenes that are effectively "invisible" to the human eye, a traditional RGB camera, a visible light detector, etc.). The active lighting source provided by the secondary sensor system may be used by the camera system to recover relevant and complementary grayscale information about the environment and provide an accurate image. As discussed in more detail below, the camera system may include a single camera (such as an event camera) or a set of multiple cameras (such as a set of RGB cameras).

In particular, the externally augmented camera system may utilize other light sources or sensor systems that may be external to the camera system (e.g., other sensors on the vehicle (such as a LiDAR) or light sources from other vehicles) in order to, for a given scene that is to be detected by the camera, illuminate a portion of the scene at different times (e.g., by emitting a light/laser pulses toward portions of the scene and/or by scanning across the scene with a laser/light signal (e.g., chirps) that is within the field of view of the other sensor. As a result, the portion of the scene to be detected by the camera that is within the secondary sensor's field of view may be: (1) illuminated actively at a given point in time by the external device/sensor; and (2) illuminated with varying intensity levels at different points in time as the external device/sensor scans the light across its field of view. Then, the detection system (e.g., a camera or set of cameras) may detect the illuminated points and, based on the differing intensities, generate an accurate image (e.g., a high dynamic range (HDR) image and/or a false-color image) of the scene. As should be appreciated, while the disclosure below is focused on the example of a LiDAR as the light source, the external device may be understood to encompass any type of light source that is capable of emitting light that is detectible by the camera system, irrespective of whether the external system is a secondary sensor system of the vehicle, is a sensor system or light source of another vehicle, or is some other light emitting device that does not necessarily detect, collect, or processes information as a "sensor" but merely emits light toward a scene (e.g., a laser diode).

An example of an externally augmented camera system 100 is shown in FIG. 1, where a vehicle may have both a light emitting system 110 (e.g., a LiDAR) and a detection system 120 (e.g., a camera system). The light emitting system 110 may be, for example, a LiDAR that has a light source 115 to emit light towards a particular field of view, and then a detector of the LiDAR may detect reflections of the emitted light that are reflected off of object(s) in the environment. At the same time, the externally augmented camera system 100 may also include a detection system 120 (e.g., an event camera or an array of cameras) that is capable of detecting at detector 125 of the detection system 120 the portions of the scene that are illuminated by the light emitted from source 115 of the light emitting system 110. The detection system 120 may then provide the detected data to a processing system that may stitch together the various portions of the scene (e.g., tile merging), perform HDR processing, or other processing techniques.

The detection system 120 of the externally augmented camera system 100 may take any number of forms and use any number of different types of detectors/cameras. For example, the detection system 120 may include a single camera (e.g., or an array of cameras) that is able to detect the portions of the scene that are illuminated by the emitted light from the source 115, where in the case of a LiDAR, might be an illuminated area around an emitted point of light, and as the LiDAR scans the scene, it may cause different exposure levels at different portions of the scene. The augmented camera system 100 may process the different portions of the scene and/or the different exposures to create a composite image of the scene. As should be appreciated, an "image" created in such a way may be a "false-color" image, in the sense that the light provided by the light emitting system and/or the dynamic range of the detector may not be able to provide a full, accurate range of colors for the detected scene, and instead, may provide "false" colors that maps attributes or intensities to different colors or scale of grey.

The detection system 120 may operate with a high detection frame rate that may match the frame rate of light pulses or sweeps of the light emitting system 110 (e.g., for a LiDAR, this may be the scanning frequency with which the LiDAR makes a complete pass across its field of view). Such a high detection frame rate may be provided by an event camera (e.g., a camera that detects the extent of intensity changes in a scene, which may have a extremely high time resolution) or may be provided by an array of slower-frame-rate cameras whose detection times may be coordinated so as to collectively simulate a higher time resolution than is possible from individual cameras in the array. The detected frames may then be fed into post-processing algorithms to perform, for example, optical flow on the frames. As should be understood, a separate detector component may be added to an existing camera system so as to be compatible with the wavelength and spectrum of the light emitting system 110 emitter so that the illumination by the emitted light may be sensed by the detection system 120. Separate from the LiDAR system that may emit light and detect the reflections, the detection system 120 may sense illuminations of portions of the scene that are highlighted by the light emitted by the light emitting system 110 (e.g., as the LiDAR scans the scene).

Figure 2:
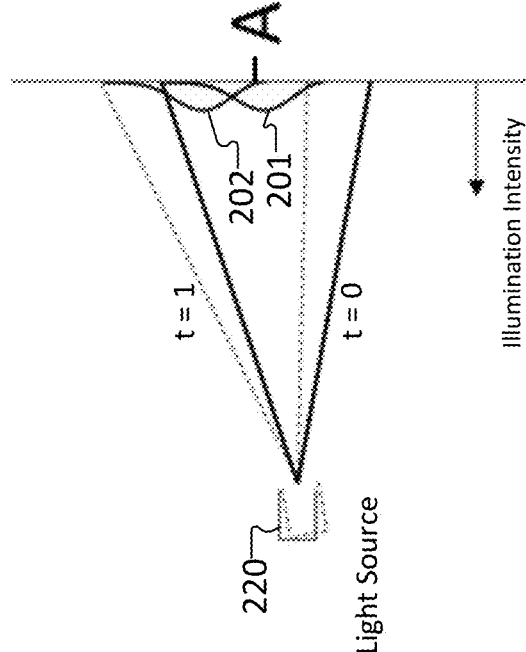
FIG. 2 shows an example of how a narrow beam laser may illuminate a surrounding area with different intensities.

In short, the detection system 120 observes the scene as the light emitting system 110 moves across the scene and illuminates portions thereof. Given that the light emitting system 110 may be a narrow-width beam of light (such as a LiDAR laser), the emitted light may not light the entire scene. Nevertheless, the detection system 120 may observe and capture not only an area of the scene corresponding to the width of the emitted beam of light but also an area around the beam of light that may also be illuminated, possibly at a lower intensity. An example of this phenomenon is shown in FIG. 2, where a light source of a light emitting system 220 (e.g., a LiDAR) might be emitting a narrow beam of light, the center of which may scan the field of view over time. The Y-axis represents different points along a length of the scene and the X-axis represents illumination intensity reflected toward the light emitting system 220. In FIG. 2, at a first time (t=0), the beam is centered at position A and may illuminate the portion of the scene defined by the solid lines extending from the light source of light emitting system 220. The intensity of light may have an illumination pattern 201 that is highest at the center and then gradually fades as a function of distance from the center. At a next time (t=1), the beam may be centered above position A and may illuminate the portion of the scene defined by the dotted lines extending from the light source of light emitting system 220. The intensity of light may have an illumination pattern 202 that is highest at the center and then gradually fades as a function of distance from the center. At this time (t=1), the illumination pattern 202 still illuminates point A, but with a lower intensity. As a result, multiple consecutive detections of a given portion of a scene may have different illuminations at different points in time as the light emitting system (e.g., 220) moves the light source across the scene (e.g., due to dispersion, scattering of light, or any number of other light-spreading phenomena). Thus, the externally augmented camera system (e.g., 100 of FIG. 1) may generate multiple images at varying illuminations, which can be processed together into an HDR representation of the environment using known processing methods. As should be understood, the externally augmented camera system (e.g., 100 of FIG. 1) may coordinate the light emitting system (e.g., 220) and the detection system (e.g., 120) so as to focus the light source to a particular region at a particular time and/or to focus the detector on a particular region at a particular time to illuminate the particular region and the particular time with the desired intensity.

Figure 3:
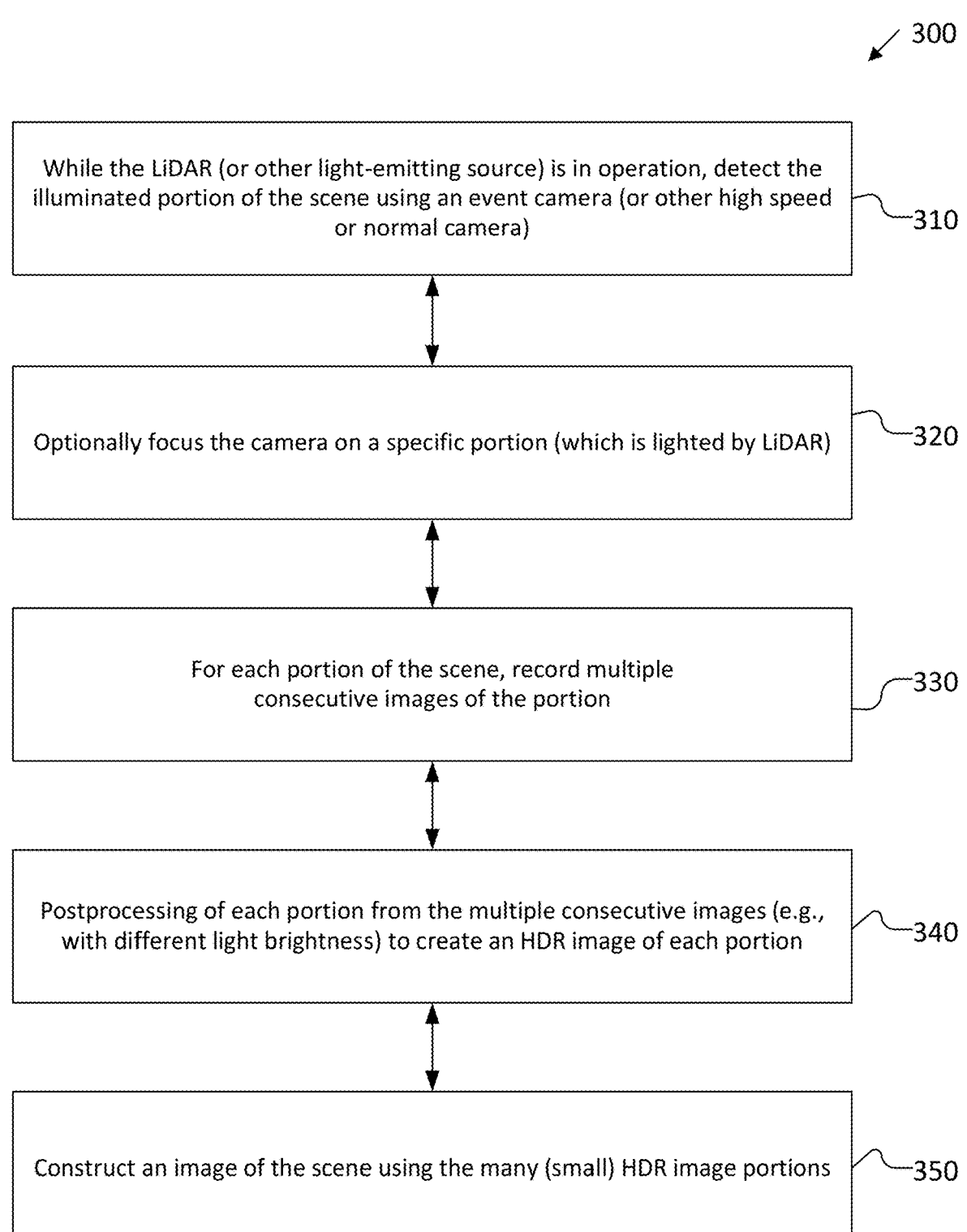
FIG. 3 shows an exemplary process that an externally augmented camera system may follow to create an image of a scene.

FIG. 3 shows an example of the process that an externally augmented camera system (e.g., an externally augmented camera system 100) may follow in order to create an image of a scene. The system may, in 310, while the LiDAR (or other light-emitting source) is in operation, detect the illuminated portion of the scene using an event camera (or other high speed or normal camera). Optionally, in 320, the system may focus the event camera on a specific detection region (e.g., that which is expected to be lighted by the LiDAR at the particular time with the particular illumination). Then, in 330, the system may, for each portion of the scene, record multiple consecutive images of the portion and, in 340, perform postprocessing on each portion from the multiple consecutive images (e.g., where each of the multiple images may illuminate the portion by a different brightness level) to create an HDR image of each portion. Then, in 350, the system may construct an image of the entire scene by joining together the many (smaller) HDR image portions.

Figure 4:
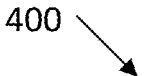
FIG. 4 shows an example of a pulsed LiDAR scanning pattern across a scene that contains a vehicle.
Figure 4:
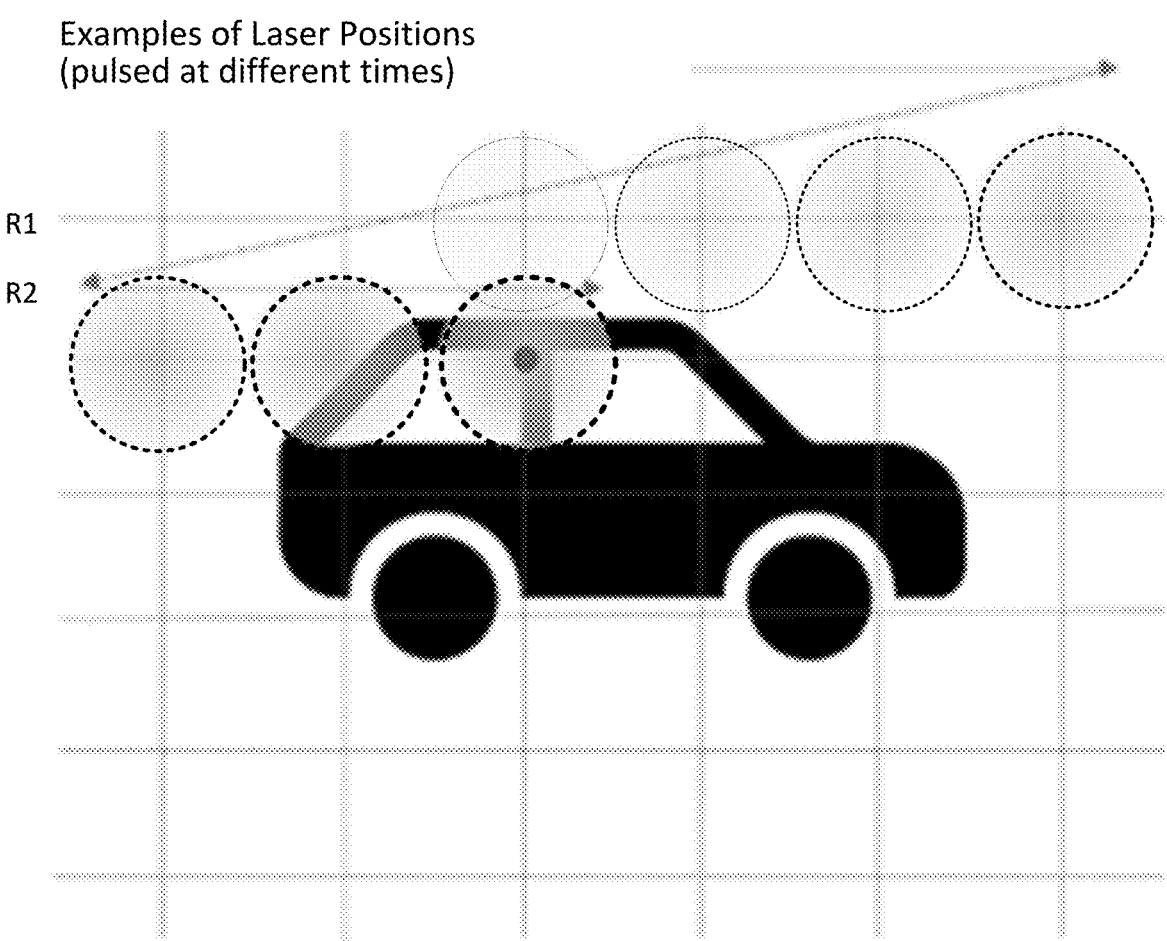

Returning to FIG. 1, light emitting system 110 may be a LiDAR sensor that has a light source 115 that sweeps across its field of view (e.g., the scene) of the environment, usually with a narrow laser that focuses on a particular point in the scene. When the laser contacts an object at the part point in the scene, the laser briefly illuminates an area around the point. As should be understood, this illumination may not be visible to the human eye, as the light source may operate outside of the visible spectrum, yet may still be detectable by a detector (e.g., detector 125 of detection system 120). An example of a pulsed LiDAR is shown in FIG. 4 that is scanning a scene (containing a vehicle object) using a left to right scanning pattern that pulses a first horizontal row of consecutive points (R1), and then moves to a second horizontal row (R2), pulsing different points, again from left to right, essentially dividing the scene into a grid. The LiDAR pulses a beam of light toward each point on the grid which illuminates an area around the center of the point (shown by the circles centered at the grid intersections). The point is briefly illuminated for a period of time and the intensity fades over time (shown by lighter shading of the earlier illuminated points as compared to the darker shading of the more recently illuminated points).

In typical LiDAR systems, for example, the area that is illuminated may actually be as large as or even larger than the sparseness of the scanning resolution, where the sparseness of the scanning resolution is the distance between consecutive points in a LiDAR sweep. This means that there may be overlap in the areas illuminated by consecutive points in a typical LiDAR sweep. For example, for a conventional LiDAR with 0.1 degrees of scanning resolution, this translates to 7 cm sparseness between points for objects that are 40 m away. At the same time, conventional LiDAR may have a light cone (e.g., the area illuminated by the narrow beam) may be up to 20 cm for objects that are 40 meters away. This means that there may be significant overlap in the portions of the scene illuminated by consecutive points as the LiDAR scans a scene. As noted above with respect to FIG. 2, because the overlapping portions may be closer or further from the center of a given beam, the overlapping portions may be lit with different brightness/intensity levels of illumination over the consecutive points. In addition, while this example is described with a pulsed beam LiDAR, many LiDAR systems no longer pulse the light source and instead use continuous scanning. In such cases, the illuminated portions may not be discrete circles but rather a continuous pattern that lights different portions of the scene with differing brightness/intensity levels of illumination.

Returning to FIG. 1, detection system 120 may be a visually-based camera (e.g., an RGB camera, IR camera, etc.), and the camera may be a filtering camera that may include a switchable optical filter to filter out unwanted light and/or eliminate noise (e.g., to allow primarily the light emitted from the light source to reach the detector when the filter). Irrespective of the type of camera, the detector 125 should be capable of receiving and processing light in the same spectrum as the light emitter 115 (e.g., the wavelength(s) of the LiDAR laser(s)). As noted above, if the externally augmented camera system 100 is to capture multiple images of the same point, each with differing levels of illumination over time, the detection system 120 should be fast enough to keep up with the LiDAR's beam sweep and also process the data. As also noted above, the detection system 100 may include multiple cameras that work in a coordinated way to capture sufficient images and keep up with the LiDAR's beam sweep. For example, for an array of cameras that are each able to capture images at 120 Hz, the camera array may be coordinated in a consecutive pattern so that one camera records the first pulse in the LiDAR's sweep, the a second camera the second pulse, the third camera the third pulse, the fourth camera the forth pulse, and then the process repeats with the first camera. In this way, a 480 Hz camera may be "emulated" by coordinating the detection among many different 120 Hz cameras.

Irrespective of the type or number of cameras, the detector system 120 may capture different images at different points in time of a portion of the scene. At different points in time, the brightness/intensity of the lightning may be different for a given region, depending on where the emitted light is directed at the point in time during which the portion of the scene is captured (as discussed above, scattering of laser light emitted from LiDAR illuminates the area around it at different intensities). Hence, individual portions of the scene (also referred to tiles) may have different brightness/intensity, depending on where the emitted light is directed at the time detector system 120 captures the image. When the detector system 120 is fast enough to capture consecutive images of the same portion of the scene with different illumination, HDR processing may be used to create an HDR image of that portion of the scene. As should be understood, HDR image processing uses multiple images of the same object, each image having a different illumination.

Depending on the type of light emitting system 110, the detection system 120 may need to adjusted accordingly. For example, if the light emitting system 110 is a LiDAR, it may be a pulsed LiDAR (e.g., based on Time of Flight of each pulse) or a Frequency Modulated Continuous Wave (FMCW), each of which may utilize a different type of laser operation and a different portion of the light spectrum. For example, it may be advantageous to coordinate the timing of the detection system 120 to the timing of pulses emitted by a pulsed LiDAR to optimize the intensity of light on the detector 125. However, this may not be necessary, given that a pulse of light may illumine the scene with a fading intensity over a period of time, so that the detector 125 does not necessarily need to be directly aligned with the timing of the emitted light. In addition, if the light emitting system 110 uses is an FMCW LiDAR, then timing coordination may be even less important because the light source of an FMCW LiDAR is continuously "on" to continuously scan across the field of view. The scanning rate of typical LiDAR sensors used in automotive vehicles is about 10 to 30 Hz, and typical event cameras are able to scan at up to multiples of 1 kHz. This means that an externally augmented camera system may utilize conventional hardware to produce differently lit portions of a scene that may be post-processed into an HDR image of the portion of the scene.

With respect to HDR image processing, conventional methods may be used that stitch together multiple images of the same scene at different brightness levels (e.g., usually three images, each captured with different brightness levels, e.g., a bright, medium, and dark image). However, because the externally augmented camera system 100 may capture only a very small portion (tile) of the overall scene, given the small area illuminated by the light emitter, each portion of the overall scene (each tile) may be combined together to form an overall image of the scene. As should be appreciated, this processing may involve coordinate transformations, motion transformation, etc., in order to account for the dynamics of the situation, including, for example, different camera perspectives, movement of the vehicle, changes in the scene, etc. In addition, other post-processing techniques may be used to adjust for contrast, overexposure, glare, etc.

Figure 5:
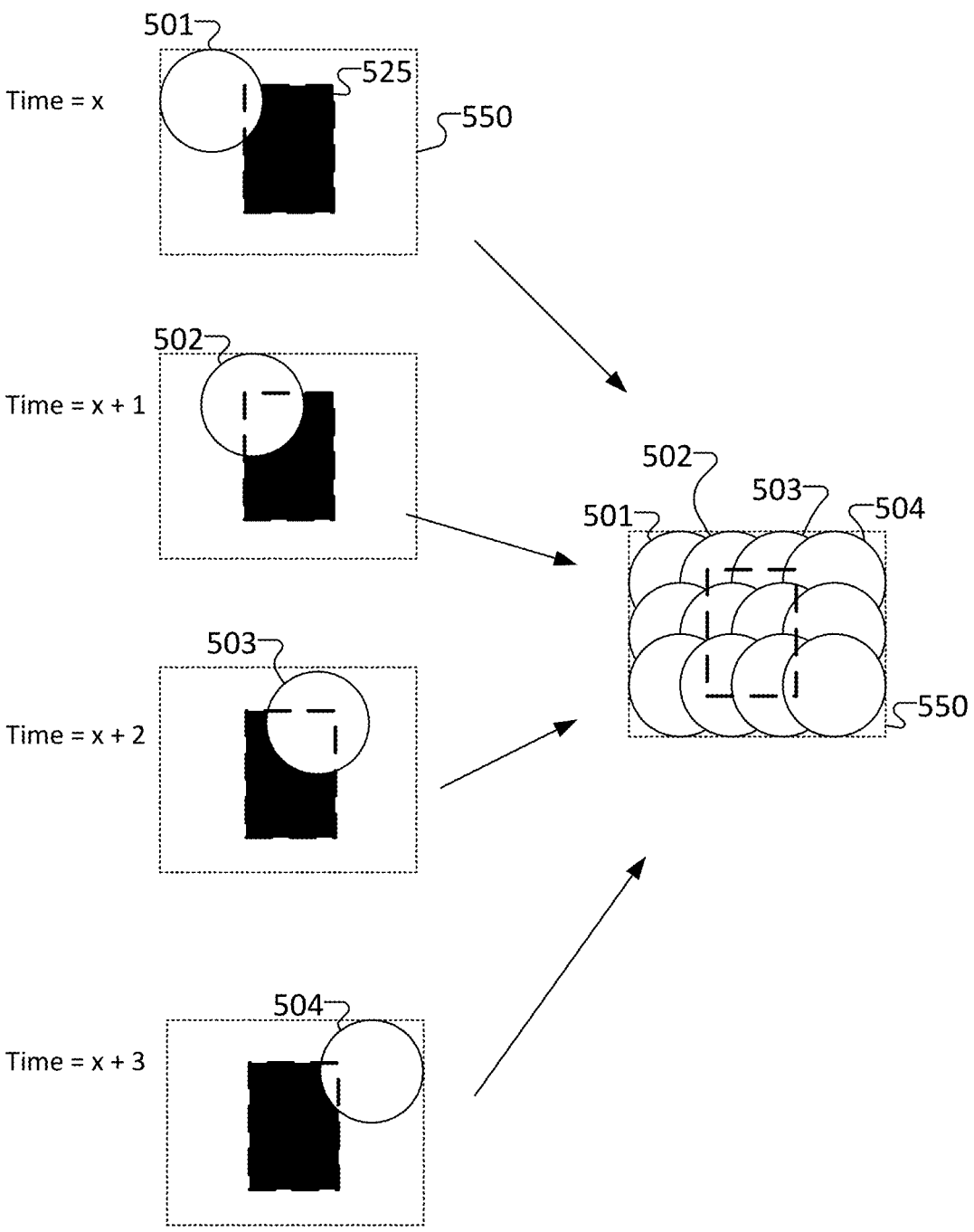
FIG. 5 shows how different portions of an exemplary object may be illuminated at different times as an emitted light moves across the scene at different times.

FIG. 5 shows, pictorially, an example of how an externally augmented camera system may scan portions of a scene 550 using an external light source, where the light source may be a pulsed LiDAR (e.g., as the light emission system 110) and an event camera (e.g., as detection system 120) may be configured to detect the LiDAR pulses. Then, as the LiDAR scans the scene 550, for each point in time (where x is one point in time, x+1 is the next point in time, x+2 is the next point in time, etc.) the LiDAR emits a pulse that illuminates an area around the pulse that covers a portion of scene 550, where scene 550 may include, for example, object 525. The event camera may capture three images of that portion of scene 525 (the tile) at different brightness levels (e.g., different levels of illumination of the same portion of the scene). In FIG. 5, four different portions (501, 502, 503, and 504) are each shown at a different corresponding point in time x, x+1, x+2, and x+3, and each portion (501, 502, 503, and 504) may have multiple (e.g., three) image captures at varying brightness levels. Then, the multiple image captures for each tile may be converted to an HDR image of the corresponding portion of the scene 550, and the scene 550 may be reconstructed by combining all of the HDR portions (tiles) of the scene 550 into an overall image. (Only the first row of scanning corresponding to portions 501 through 504 are numbered in FIG. 5, but it should be appreciated that the LiDAR may scan the remaining rows at other times to cover a, for example, 4×3 grid of tiles). As should be understood, the timing and number of pulses is merely exemplary, and any type of timing and any number of tiles may be used. As noted above, though not necessary, if the LiDAR is a pulsed LiDAR, it may be helpful for the detection system to receive the estimated time-of-flight so that the detection system may coordinate the image capture by accounting for the delay in when the scene's illumination reaches the detector and/or by associating the detected image with the beam angle of the laser at the time that the respective light was emitted.

As should be appreciated, multiple light sources may be used (e.g., multiple different LiDAR), each of which may be at a different angle to the target, use different colors of light, or otherwise operate differently, and the detector may need to be configured according to the type of light source used. For example, a LiDAR may be a Pulsed Direct Time of Flight (ToF), Amplitude Modulated Continuous Wave (AMCW) or Frequency Modulated Continuous Wave (FMCW). If multiple different light sources are used (e.g. different LiDARs on the same vehicle, different LiDARs on different vehicles, etc.) to illuminate the same scene, the detection system may need to differentiate among the different light sources and therefore may need to process images fast enough to be able to differentiate among the different light sources by capturing the light a time corresponding to a particular source's light emission. This differentiation may be advantageous for providing additional information about objects in the scene (e.g. additional info on shape such as depth), given that each light source may be from a different angle.

Figure 6:
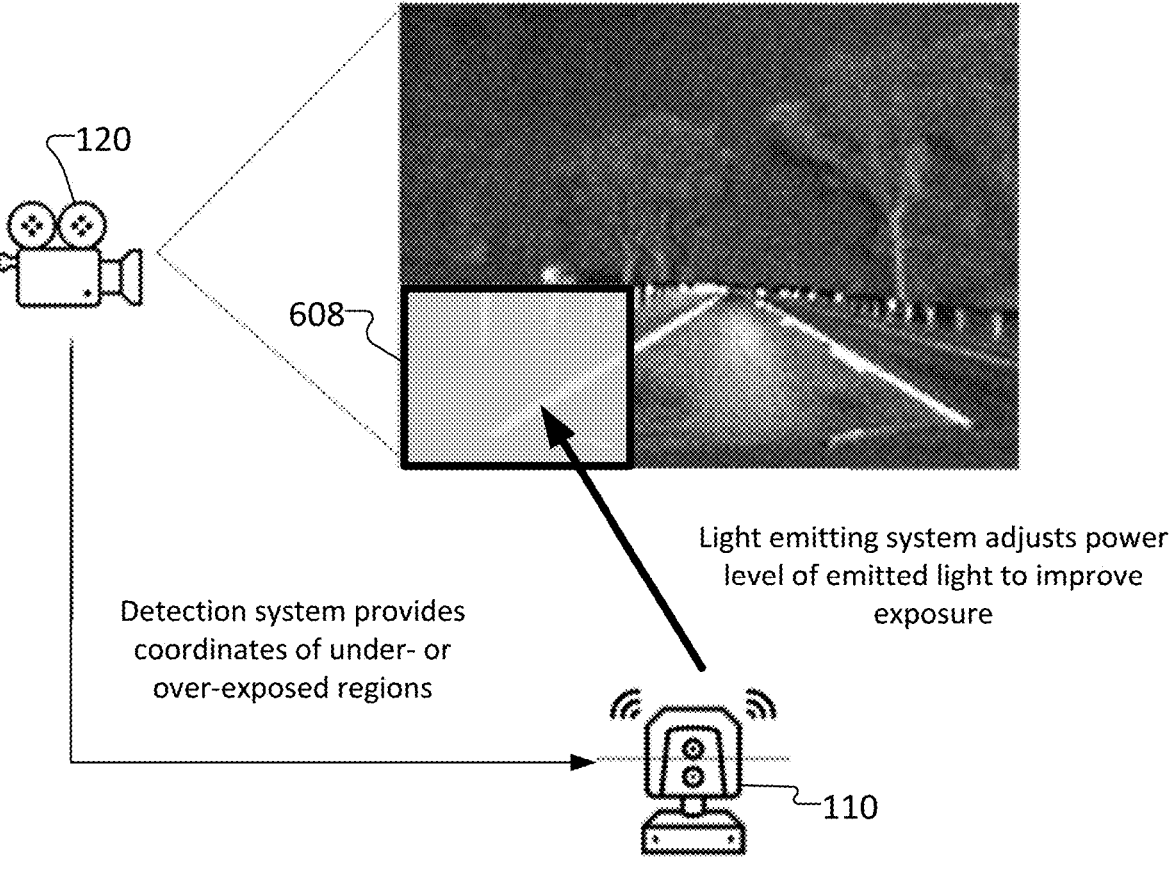
FIG. 6 shows an example of how a detection system may provide feedback to the light emitting system to adjust its emitted light to improve detection of a particular portion of a scene.

While HDR processing may be advantageous in generating a quality image that helps avoids under-exposure or over-exposure of the image, it comes at the expense of frame rate because of the number of exposures needed to render each frame. For example, if three differently-contrasted images are used to generate a single frame, the frame rate is one-third of the actual frame rate. Thus, in addition to or as an alternative to HDR processing, other techniques for controlling under- and over-exposure may be used. For example, the light emissions from light emission system may be dynamically configured based on feedback from the detection system. For example, if the detection system identifies areas in the scene that are under- or overexposed, the detection system may identify the coordinates of theses areas to the light emission system so that it may make adjustments to the emitted light for these identified areas. For example, the light emission system (e.g., light emission system 110) may instruct the light source (e.g., light source 115) to output higher power light (if the region was underexposed), lower power light (if the region was overexposed), change an angle of the emitted light, change a wavelength of the emitted light, change the scan frequency of the emitted light, to scan a particular set of coordinates that corresponds to the targeted region. An example of this is shown in FIG. 6, where detection system 120 has identified an area 608 of the image that is underexposed. Detection system 120 may provide the coordinates of area 608 to the light emission system 110 so that it may increase the output power of the emitted light when scanning this area to improve the exposure without the need for multiple-HDR images, and therefore, at a higher effective frame rate. As should be appreciated, the externally augmented camera system 100 may need to perform coordinate transformations to map the coordinates from the image plane into the coordinate system of the light source (e.g., the point cloud for a LiDAR system) such that the correct area is targeted.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A system comprising:
   a sensor comprising a light source capable of emitting light toward a scene;
   a camera separate from the sensor, wherein the camera comprises a detector capable of detecting emitted light from the light source; and
   a processor configured to:
   cause the sensor to emit light toward the scene via the light source;
   cause the camera to capture image data of the scene that has been illuminated by emitted light from the light source, wherein the image data comprises a series of image data frames of the scene, each frame representing a portion of the scene; and
   combine the series of image data frames to generate an image of the scene based on the image data.

2. The system of claim 1, wherein the detector is configured to capture the image data at different points in time, wherein for each point in time, the detector is configured to detect, as the image data, emitted light reflected by the scene at varying intensities as a function of a distance between an incident location of the emitted light on the scene and a reflected location within the scene of the light reflected by the scene.

3. The system of claim 1, wherein the sensor comprises at least one of a light detection and ranging sensor comprising a laser as the light source, an infrared (IR) sensor comprising a light-emitting diode as the light source, or a radar sensor comprising a radar transmitter as the light source.

4. The system of claim 1, wherein the camera comprises a high-speed camera, an event camera, a filtering camera comprising a switchable optical filter, a red-green-blue (RGB) camera, or an IR camera.

5. The system of claim 1, wherein the image data of the scene comprises partial image data of a subregion of the scene that is at least partially illuminated by the emitted light.

6. The system of claim 1, wherein the processor is further configured to, in order to combine the series of image data frames, stitch together the image data frames or perform a high dynamic range processing of at least two of the image data frames.

7. The system of claim 6, wherein each frame of the at least two image frames comprises a different brightness of the scene with respect to each other of the at least two image frames.

8. The system of claim 6, wherein the series of image data frames comprise a first frame and a second frame of a portion of the scene, wherein the first frame comprises a first illumination of the portion of the scene, wherein the second frame comprises a second illumination of the portion of the scene, wherein the first illumination is different from the second illumination.

9. The system of claim 6, the system further comprising a plurality of cameras and a corresponding plurality of detectors, wherein the camera is one of the plurality of cameras and the detector is one of the corresponding plurality of detectors, wherein the processor is further configured to cause the plurality of cameras and the corresponding plurality of detectors to, in an alternating succession to one other, capture the series of image data frames.

10. The system of claim 9, wherein the alternating succession comprises a consecutive capture of each frame in the series of image data frames by a different camera of the plurality of cameras.

11. The system of claim 1, wherein the processor is further configured to cause the detector to capture the image data at a sensing time that is based on an emission time of the emitted light from the sensor.

12. The system of claim 1, wherein the processor is further configured to, in order to cause the sensor to emit light from the light source toward the scene:
    cause a series of light pulses to be emitted as the emitted light; or
    cause a continuous light source to be emitted as the emitted light, wherein the continuous light source comprises light emissions that vary over time by different frequencies or by different amplitudes.

13. The system of claim 1, wherein the processor is further configured to adjust an output intensity of the emitted light based on a distance to the scene or based on a previously generated image of the scene.

14. The system of claim 13, wherein the processor is further configured to, in order to adjust the output intensity of the emitted light based on the previously generated image of the scene, adjust the output intensity of the emitted light based on an exposure level of the previously generated image.

15. The system of claim 1, wherein the sensor is configured to emit, as the emitted light, a narrow beam of laser light that is substantially narrower than a dimension of the scene.

16. A non-transitory computer readable medium that comprises instructions which, if executed, cause one or more processors to:
    cause a sensor comprising a light source to emit light toward a scene in an environment of a vehicle;
    cause a camera to capture a series of image data frames at different times of the scene that has been illuminated by emitted light from the light source, wherein the camera is separate from the sensor, wherein the camera comprises a detector capable of detecting emitted light from the light source; and
    combine the series of image data frames for one time of the different times to generate an image of the scene based on the image data.

17. The non-transitory computer readable medium of claim 16, wherein the instructions also cause the one or more processors to focus the detector on a subregion of the scene based on a direction of the emitted light from the sensor.

\* \* \* \* \*